(12) United States Patent
van der Zijpp

(10) Patent No.: US 7,495,676 B2
(45) Date of Patent: Feb. 24, 2009

(54) PROCESS FOR CREATION AND DISPLAY OF MERGED DIGITAL IMAGES

(75) Inventor: Robert van der Zijpp, Shailer Park (AU)

(73) Assignee: Admotion Holdings Pty Ltd., Stafford, Qld. (AU)

( * ) Notice: Subject to any disclaimer, the term of this patent is extended or adjusted under 35 U.S.C. 154(b) by 0 days.

(21) Appl. No.: 10/626,163

(22) Filed: Jul. 24, 2003

(65) Prior Publication Data

US 2004/0257382 A1    Dec. 23, 2004

(30) Foreign Application Priority Data

Oct. 31, 2002    (AU) ............................... 2002952371

(51) Int. Cl.
*G09G 5/00*    (2006.01)
(52) U.S. Cl. ........................ 345/635; 345/588; 345/627; 345/628
(58) Field of Classification Search .......... 345/629–641
See application file for complete search history.

(56) References Cited

U.S. PATENT DOCUMENTS

| | | | | |
|---|---|---|---|---|
| 4,897,802 A * | 1/1990 | Atkinson et al. ............... 40/362 |
| 5,638,156 A * | 6/1997 | Dehli ........................... 355/72 |
| 6,088,018 A * | 7/2000 | DeLeeuw et al. ............ 345/156 |
| 6,091,482 A * | 7/2000 | Carter et al. .................... 355/79 |
| 6,118,584 A * | 9/2000 | Van Berkel et al. .......... 359/463 |
| 6,137,498 A * | 10/2000 | Silvers ........................ 345/629 |
| 6,157,747 A * | 12/2000 | Szeliski et al. .............. 382/284 |
| 6,359,631 B2 * | 3/2002 | DeLeeuw .................... 345/629 |
| 6,532,312 B1 * | 3/2003 | Corkran ....................... 382/284 |
| 2002/0067500 A1 * | 6/2002 | Yokomizo et al. ........... 358/1.15 |
| 2003/0025933 A1 * | 2/2003 | Kimura et al. .............. 358/1.15 |
| 2003/0200268 A1 * | 10/2003 | Morris ........................ 709/206 |
| 2004/0054630 A1 * | 3/2004 | Ginter et al. ................... 705/53 |

\* cited by examiner

*Primary Examiner*—Mark Zimmerman
*Assistant Examiner*—David Chu
(74) *Attorney, Agent, or Firm*—Renner, Otto, Boisselle & Sklar, LLP

(57) ABSTRACT

A process for the creation of a merged image comprising the steps of preparing at least two base images in digital format, selecting a pattern wherein said pattern comprises a multiplicity of cells, each cell having n regions wherein n is the number of prepared base images and wherein each region of a cell is assigned to a different prepared base image, applying the pattern to each base image, selecting a mergable portion of each respective base image wherein the mergable portion includes a tile corresponding to the region of each cell assigned to the respective base image, and merging of the mergable portions of each respective base image to provide a merged image.

19 Claims, 9 Drawing Sheets

PROCESS FOR CREATION AND DISPLAY OF MERGED DIGITAL IMAGES

BACKGROUND OF THE INVENTION

The present application is a Convention application based upon Australian provisional patent application No. 2002952371, filed 31 Oct. 2002.

1. Field of the Invention

The present invention relates to software and in particular to a process for the creation of an image by merging multiple independent image files and output of the created image.

2. Discussion of Related Art

Methods for the creation and display of multiple independent images from a mosaic of pixels which are interwoven in a predetermined arrangement such that each of the images can be selected by precise positioning of a screen in different positions relative to a grid mask which masks out all but pixels of a selected image are known, particularly in the field of advertising.

With the advent of modern display advertising, limitations on advertising budgets and limited locations for display to high densities of consumers, a great demand has arisen for displaying multiple advertisements at individual popular display locations thereby enabling a number of advertisers to benefit from a single location. Numerous different methods and devices have been proposed for prepaying and displaying such advertisements. Many such devices involve relatively unwieldy mechanical elements driven by complex drive mechanisms which require a certain degree of mechanical precision. Thus, in addition to the expense of original manufacture, the user is often faced with expensive maintenance.

In addition, operation of these current drive mechanisms tend to produce an undesirable amount of noise. Typically, these devices are used in public retail outlets or other public locations. The noise level of the drive mechanism frequently predominates over the background music being played at such locations. This noise detracts from the overall environment sought by the retailers at the location where the advertising display is positioned.

One such apparatus used in the advertising field has a transparent image screen which contains a mosaic of four discrete images formed from pixels which are interwoven in a predetermined arrangement such that each of the images are selected by precise positioning of the screen in four different positions relative to a grid mask which masks out all but pixels of a selected image. A platen comprising a platen surface which is supported by a rib structure mounts the image screen and is moveable through a precise pattern for selecting the pixels, and thereby the image, to be projected. A pair of arms are coupled to the platen and an eccentric drive and are driven by the eccentric drive to advance the platen positively through the pattern.

The majority of devices accomplishing this transition of images are mechanical in nature and are used on billboards and the like. It is desirable to have a system that displays multiple images wherein the exchange from one image to another is nearly instantaneous thereby enabling sequential display of different images which gives the impression of animation. Such a sequential display would draw and hold a viewers attention on what would appear to be an animated advertisement.

Display devices including templates with patterns of apertures which define numbers, letters or figures when they are illuminated by back lighting have also been described. There have also been display devices described including transparency sheets which have images thereon and which are illuminated by back lighting and an overlay mask which blocks the back lighting from illuminating certain areas of the transparency sheets.

In addition, devices have been proposed which include a translucent image screen made up of a mosaic of discrete images formed by relatively small interlaced translucent pixels or window segments which are arranged in uniform groups. The pixels corresponding to a discrete image occupy the same relative position in each group and hear corresponding magnitudes of translucency. The image screen may then be covered with an opaque screen having a uniform pattern of transparent display apertures. The opaque screen blocks back lighting from shining through the image screen except through the display apertures. The uniformly patterned display apertures are then aligned with pixels which correspond to a discrete image and the discrete image is thereby displayed due to the back lighting shining through the image screen and display apertures. The opaque screen may then be selectively shifted on the image screen such that the display apertures align with the pixels of a different discrete image. Thus, each discrete image may be sequentially displayed.

Systems which are similar in concept to those described above are used to create images for film. One such system is an exposure system for creating a single frame transparency which has an enlarger rack with a transparency fixture including a light obscuring exposure mask and a multi axial table for relative movement there between during an exposure process which results in a single transparency having four independent images. Each of the images have spaced apart groups of pixels interlaced with the groups of pixels from each of the other images, and each of the images are selectable for projection by a movable grid mask. The transparency is formed by sequentially exposing portions of a sheet of film overlayed by a grid-like mask, and correspondingly repositioning the film after each exposure such that a new interlaced area of film is exposed.

A variety of exposure fixtures and methods have been disclosed for making single sheet transparencies containing multiple images for subsequent individual display in a selected sequence. Commonly referred to as "step and a repeat" registration systems, some of these devices provide a positioning fixture for multiple image exposures onto a single sheet of film. One such device discloses a stage upon which photosensitive film is mounted. The stage is moveable along a horizontal plane defined by two perpendicular drives, and enclosed within a glass-covered housing. Elevated above the stage are two parallel spaced tape lengths securing an image bearing negative. A light source positioned above the secured negative provides a light beam capable of projecting the image onto a particular section of the film, with the remainder of the film obscured from the light. Incrementally re-positioning the film after each successive exposure is performed by a stepping motor and a control circuit, resulting in an exposed sheet of film containing separated multiple images.

Step and repeat exposure methods associated with the type of fixture described above generally begin by exposing a particular negative onto an unmasked portion of film. Next, the "step and repeat" fixture is utilised in an effort to precisely move either the film or a mask to the corresponding location for the next image to be exposed. The process repeats as desired until the film is completely exposed.

Attempts to overcome a problem known as "interlacing" have been made by providing a specially masked fixture. The fixture is part of an exposure system, comprising a camera and a framework for mounting a projector. A mirrored, folded light path is provided through the framework for columnating the light to obtain full size pixels. This mirrored path is necessary to minimise divergence of the projected light from the light source, often causing shadowing and oversizing of exposed pixels duo to the relatively small sizing of the mask apertures through which the projected light passes. The system further includes a mask capable of obscuring and passing preselected segments of light, and a moveable vacuum mount with film mounted thereon.

The corresponding method of fabrication used with the fixture begins by supplying an image bearing negative along with a full size sheet of film. The fixture mask allows "segments" of the overall image to be exposed onto the film, while still preserving the overall image likeness. Projecting the image onto the masked film initiates the exposure process thus exposing a portion of the transparency with the image. Next, a new negative is supplied and the process repeated. After four such exposures, the resulting transparency forms a mosaic having groups of interlaced pixels corresponding to the four discrete images. Although offering some benefits in that the fixture and method offers a movable mount and a light obscuring mask to interlace the images, due to the fact that the device is large and relatively complex because of the mirrored path, it has not gained general commercial acceptance.

A further limitation often affecting prior art mosaic fixtures and methods involves a phenomena commonly referred to as "white flash", which often compromises the quality of the finished product. Representing bright border streaks adjacent to opaque pixel boundary lines, "white flash" detracts from the quality of the image presentation during an image transition, causing attention to the bright aberrations momentarily observable on the display viewing surface. Careful exposure techniques may result in a transparency free from "white flash", However, such techniques often require exact alignment between the exposure mask and film to prevent exposure voids between pixels. Such time consuming care creates a more costly finished product and renders the quality of such product highly dependent on the care and skill exercised by the operator.

As discussed above, the methods for creating multiple images is generally used in large scale applications such as on billboards or films. There have been rapid advances in the production and display of digital images, and most of these images are stored in a file containing information about the image. There are numerous file formats which store image data in different ways for example, from top to bottom and pixels in red/green/blue order. Different formats also support different image compression rates.

SUMMARY OF THE DISCLOSURE

We have now created a process for the creation of merged images that allows improved control of the interlacing or merging of sections of the base images. We have found that by directing the output of merged digital images we may at least partially overcome the abovementioned disadvantages or provide the consumer with a useful or commercial choice.

In one form the invention resides in a process for the creation of a merged image comprising the steps of:
a. preparing at least two base images in digital format;
b. selecting a pattern wherein said pattern comprises multiplicity of cells, each cell having n regions wherein n is the number of prepared base images and wherein each region of a cell is assigned to a different prepared base image;
c. applying the pattern to each base image;
d. selecting a mergable portion of each respective base image wherein the mergable portion includes a tile corresponding to the region of each cell assigned to the respective base image, and
e. merging of the mergable portions of each respective base image to provide a merged image.

The invention particularly relates to a software process for the adaptation of each of the base images into a mergable form and following this, the merging/interlacing of multiple independent image files into a single image for output. The invention also relates to the creation and output of the single file using a computer network based system. The resulting single merged image may be adapted for printing, outputting to film or colour separations.

The images of each base image once adapted according to the method may suitably be merged digitally to form a single layer image. Other additional layers may be added.

Preferably, at least one additional layer may be added to the merged image. Typically, an additional layer can be added, the entire additional layer being digitally transparent except for advertising material such as trade marks and other digital information for example vernier scales, image borders, alignment grids or the like. The additional layer may comprise a grid of opaque lines separating the individual regions. The addition of this layer may prevent white flash and/or increase the alignment error margin which is not possible with current output systems.

The pattern to be applied to each of the base images may be a grid pattern. Suitably each base image may have a grid applied to it, to notionally adapt the base image into a plurality of cells, each cell may be further notionally adapted into a multiplicity of regions. The grid of the pattern may be of any dimension, but will preferably be sized according to the dimensions of either the base image or the dimensions of the merged image which is required by a user. The cells and regions into which the grid notionally adapts each base image will preferably be sized according to the dimensions of either the base image or the dimensions of the merged image which is required by a user.

The cells and/or regions into which each base image is notionally adapted may preferably be square, but alternatively may be of any other shape. For example, the cells and/or regions may be rectangular, round or circular, hexagonal, waveform or any shape. The shape of the cells and/or regions may be chosen for reasons of efficiency or appearance, or alternatively to create a particular watermark on the merged image.

The shape of cells and/or regions may also be chosen to achieve or maintain high tolerance with regard to pixel or cells and/or region spacing. An opaque border surrounding each pixel may be incorporated into the merged image to reduce the problem of "white flash". It is typically important that high tolerances be maintained with regards to pixel sparing to maximise the effectiveness of the process.

Different base images may be divided into differently shaped cells and/or regions. Preferably the cells would be of the same shape but they may be differently shaped.

The size of the cells and/or regions into which each base image is divided may be similarly chosen on the basis of efficiency and maintenance of the required tolerance with regard to pixel spacing. For example, the digital nature of the current process may allow the regions to approximate individual pixel sizes. However, the actual size chosen for the cells and/or regions may be governed to a large extent by the dimensions of the screen used in the display of the merged image. The screen or merged image may be moveable between different positions relative to a grid mask which masks out all but the cells and/or regions of a selected base image.

The creation of the cells and/or regions for each or the base images may suitably be such that when they are combined to form the merged image, the cells and/or regions of each adapted image may be interlaced closely or at any required spacing. In this manner, the tolerances of the screen used in the display of the merged image may be taken into account. For example, a screen which is manufactured poorly or with a lower than expected tolerance, may still be usable if the separation of the sections of the merged image are spaced accordingly. Due to the digital nature of the creation of the merged image according to the present invention, control over the spacings of the cells and/or regions may allow for the continued use of otherwise unusable screens.

There may be any number of base images merged into the merged image. Preferably, four images may be used as this allows the sections to be efficiently located when applying the pattern to the image and also may render the overlaying of the adapted images simpler and allow higher tolerances.

A further advantage of the present invention is that the merged file can be dimensionally distorted to allow for inaccuracies in the output equipment. If, for example, the outputted merged mosaic is skewed, then the file may be skewed in the opposite direction prior to output in order that the finished output mosaic is dimensionally accurate. A similar correction may be made if the image is longer, shorter or distorted in any other way.

In another form the invention resides in a computer network based process comprising the steps of, a. at least one end user supplying at least two base images to an image interrogation moans;
b. the image interrogation means checking the base images for suitability and size;
c. preparing at least two base images in digital format:
d. selecting a pattern wherein said pattern comprises a multiplicity of cells, each cell having n regions wherein n is the number of prepared base images and wherein each region of a cell is assigned to a different prepared base image;
e. applying the pattern to each base image;
f. selecting a mergable portion of each respective base image wherein the mergable portion includes a tile corresponding to the region of each cell assigned to the respective base image;
g. merging of the mergable portions of each respective base imago to provide a merged image; and
h. forwarding the merged image to the end user.

According to this embodiment of the invention, the base images may preferably be forwarded to an image interrogation means or operator who may similarly forward the base images to a third party of the application of the process for the creation of the merged digital image. The image interrogation means may simply be an system or intermediary who may undertake extraneous actions such as checking the base images for suitability and size, but preferably the image interrogation means or intermediary does not apply the process for the creation of the merged digital image. At this stage, one or more image adjustment processes may be applied to any or all of the base images. For example, the images may have properties such as contrast, color, brightness, or any other image property may be adjusted. For example, it is preferred that all base images are or the same size and resolution.

The third party may suitably be a licensor of the technology and/or process and may selectively control access and use of the process through license agreements with at least one licensee. According to the license agreements, the third party/licensor may collect income in the form of licence or royalty payments from the licensees, based on parameters of the base images or merged image. For example, records may be maintained by the licensor of various parameters of the images produced by the process or those to which the process is applied. The parameters may include the type of image forwarded, the size of the base images and/or the merged image or input data. The dimensions of the images according to these parameters may be the basis for the calculation of the royalty or license tees.

Various modes of transfer of both the base images and the merged image are anticipated. For example, usually after the application of the process to the base images, the third party may forward the merged image to the operator and the operator may forward the merged image on to the end user. However, the base images may be processed partly by the operator and partly by the third party, or entirely by the third party.

The output of the merged image may also be selectively controllable. As stated earlier, the merged image may be adapted for printing, outputting to film or colour separations. The merged image may be maintained and transferred in digital format for example as a computer file. The image may be adapted to be transferred from the digital image form at the end of the process creating it into any other form which may be useable by the end user, operator and/or third party. The image may be reproduced in any hard or soft copy format.

The operator may suitably create the output of the merged image or alternatively, the third party may create the output of the merged image and forward it to the operator.

A major advantage of the present invention is that the merged images may be created from digital image files and processed into a final merged image output. In this may circumvent the need for an initial output in the form of photographic negatives or film and subsequent use of other expensive or complex devices to output and merged image into a predetermined size. With the above described process, single merged image output may be efficiently and economically created in a variety of sizes.

Accordingly, if the above described process is used via a computer network, a third party/licensor may be able to accurately track individual merged images and their designs and the quantity of base images and/or merged images output for a particular operator/licensee. This may allow the imposition of a royalty or license fee arrangement between the third party/licensor and the operator/licensee based on the dimensions of the base images and/or the single merged image produced.

According to a particularly preferred embodiment of the present invention, each adapted image may be created by deleting or rendering digitally transparent, a number of cells and/or regions. The number of cells and/or regions deleted or rendered digitally transparent from each base image after the digital grid or pattern has been applied may be related to the number of base images to be merged. For example, if the number of base images to be merged is n, then the number of cells and/or regions deleted or rendered digitally transparent from each base image to create each respective adapted image is n−1. The deleted or digitally transparent cells and/or regions may be replaced with a transparent portion and the unaltered cells and/or regions of each base image remain as they were in the base image. The position of the cells and/or regions of the base image which are to be deleted or rendered digitally transparent may depend at least upon the number of base images and the configuration of the merged image.

DESCRIPTION OF THE PREFERRED EMBODIMENTS

Figure 1:
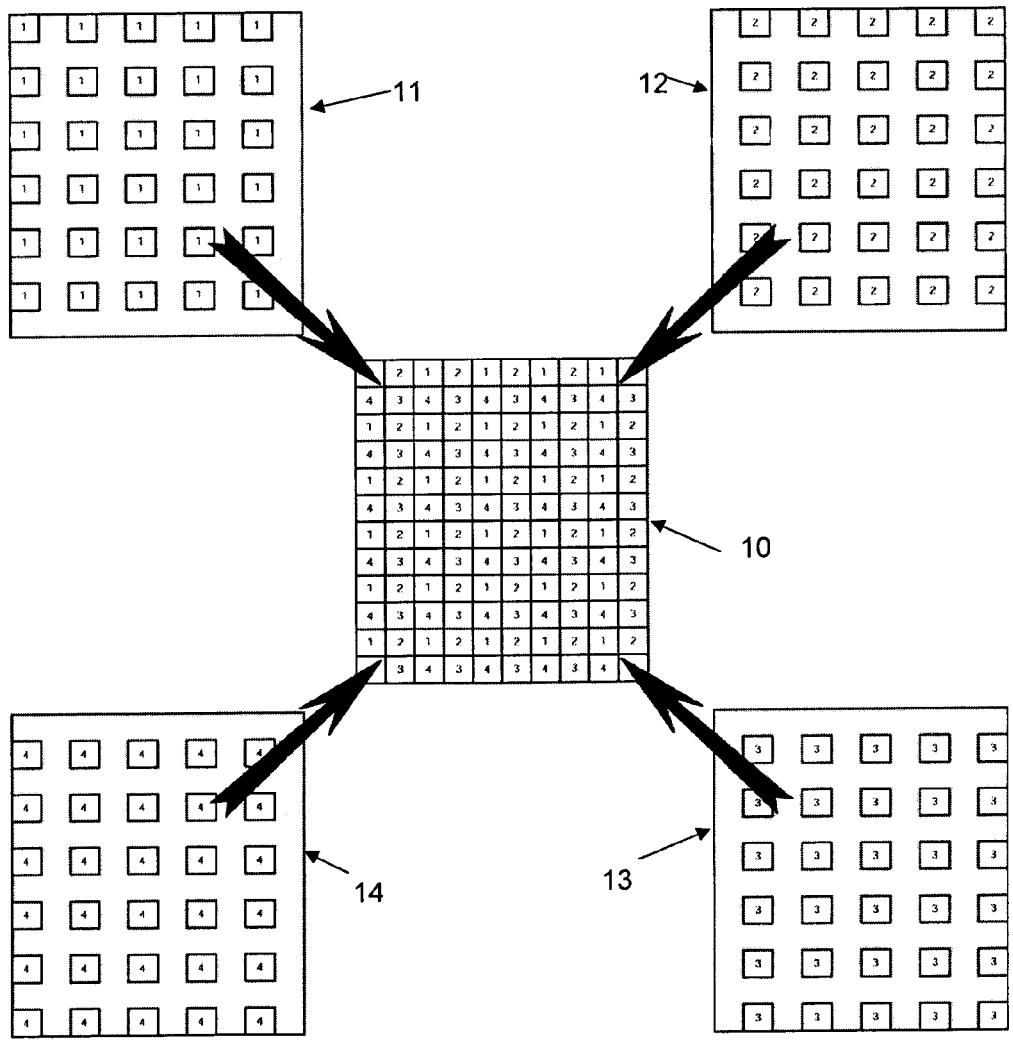
FIG. 1 shows a schematic view of a process according to a first aspect of the present invention applied to four base images and the pattern applied is a square grid.

With reference to FIG. 1, a process for the creation of a merged digital image is there illustrated which exemplifies the present invention. The process illustrated in FIG. 1 uses four base images and the pattern applied is a square grid 10A. It is to be understood that "pattern" as used throughout this specification is intended to mean anything fashioned or designed to serve as a model or guide for something to be made.

The merged digital image 10 created according to the process illustrates that the adapted base images have been merged/flattened into a final image. The merged image is divided into cells and/or regions which are viewable to form the respective base images when the cells and/or regions of the other base images are obscured or otherwise prevented from exposure using a screen or grid. According to this example, the cells and/or regions of each of the base images are square as this is generally the most efficient shape for a 4 base image display system.

The initial steps of the process are applied to each of four base images. The process may be applied to each base image consecutively or simultaneously. Once an end user has identified of at least two base images, the base images are prepared in a digital format. Preparation of the base images in digital format mainly comprises scanning the images into a computer file in one of the picture file formats if they are not already in this form. The base images all should be the same size and resolution.

Each of the base images (not shown) are divided into a multiplicity of cells and/or regions Illustrated in FIG. 1 and identified using matrix coordinates. An adapted image is created corresponding to each base image wherein the cells and/or regions of the base image are deleted, rendered transparent, or otherwise selected, the position and number of the cells and/or regions deleted or rendered transparent being relative to the number of base images to be merged, and the cells and/or regions of each adapted image being offset from the cells and/or regions of each other respective base image.

With particular reference to a first base image 11, each adapted image of the respective base images 11, 12, 13 and 14 is created by deleting or rendering transparent a number of cells and/or regions simulating spacings which relate to the positions of cells and/or regions of the respective other base images in the merged image. Each base image has a horizontal aspect and vertical aspect. The deletion or rendering transparent of each of the cells and/or regions provides a transparent portion of the adapted image wherein every second column horizontally is transparent starting with the second column, as is every second row in a vertical aspect of the image starting with the second row. The cells and/or regions of the first base 11 image corresponding to cells and/or regions located in every second column starting with the second column have been deleted or rendered transparent so that after creating the adapted image of the first base image 11, these cells and/or regions appear as transparent.

Similarly, the cells and/or regions of the first base image 11 corresponding to cells and/or regions located at every second row starting with the second row have been deleted or rendered transparent so that after creating the adapted image of the first base image 11, these cells and/or regions appear as transparent. Similar transformations are performed on each of the other alternate rows of the first base image 11 to form the adapted image of the first base image 11. The transformations are applied on a grid basis by retaining all of the cells and/or regions which the digital grid has numbered "1" and deleting all of the other cells and/or regions of the first base image 11.

The cells and/or regions of the second base image 12 corresponding to cells and/or regions located in every second column starting with the first column have been deleted or rendered transparent so that after creating the adapted image of the second base image 12, these cells and/or regions appear as transparent.

Similarly, the cells and/or regions of the second base image 12 corresponding to cells and/or regions located in every second row starting with the second row have been deleted or rendered transparent so that after creating the adapted image of the second base image 12, these cells and/or regions appear as transparent. Similar transformations are performed on each of the other alternate rows and columns of the second base image to form the adapted image of the second base image 12. The deletion or rendering transparent of each cells and/or regions provides a transparent portion of the adapted image wherein every second column starting with the first column is transparent as is every second row of the image starting with the second row. The transformations are applied on a grid basis by retaining all of the cells and/or regions which the digital grid has numbered "2" and deleting or rendering transparent all of the other cells and/or regions of the second base image 12.

The cells and/or regions of the third base image 13 corresponding to cells and/or regions located in every second column starting with the first column have been deleted or rendered transparent so that after creating the adapted image of the third base image 13, these cells and/or regions appear as transparent.

Similarly, the cells and/or regions of the third base image 13 corresponding to cells and/or regions located in every second row starting with the first row have been deleted or rendered transparent so that after creating the adapted image of the third base image 13, these cells and/or regions appear as transparent. Similar transformations are performed on each of the other alternate rows and columns of the third base image 13 to form the adapted image of the third base image 13. The deletion or rendering transparent of each cells and/or regions provides a transparent portion of the adapted image wherein every second column starting with the first column is transparent as is every second row of the image starting with the first row. The transformations are applied on a grid basis by retaining all of the cells and/or regions which the digital grid has numbered "3" and deleting all of the other cells and/or regions of the third base image 13.

The cells and/or regions of the fourth base image 14 corresponding to cells and/or regions located in every second column starting with the second column have been deleted or rendered transparent so that after creating the adapted image of the fourth base image 14, these cells and/or regions appear as transparent.

Similarly, the cells and/or regions of the fourth base image 14 corresponding to cells and/or regions located in every second row starting with the first row have been deleted or rendered transparent so that after creating the adapted image of the fourth base image 14, these cells and/or regions appear as transparent. Similar transformations are performed on each of the other alternate rows and columns of the fourth base image to form the adapted image of the fourth base image 14. The deletion or rendering transparent of each cells and/or region provides a transparent portion of the adapted image wherein every second column starting with the second column is transparent as is every second row of the image starting with the first row. The transformations are applied on a grid basis by retaining all of the cells and/or regions which the digital grid has numbered "4" and deleting all of the other cells and/or regions of the fourth base image 14.

It is important to the working of the invention that a person skilled in the art will recognize that the transformations outlined above are representative transformations only for the particular embodiment. The transformations given above are only applicable to the merging of four base images and the particular transformation of any one the four adapted images may be interchanged with the transformation of any of the remaining three adapted images. Different transformations are to be applied when dealing with different numbers of base images and the mathematical formulations of such transformations are identifiable by a person skilled in the art.

Once the deletion of the sections has been accomplished or they have been rendered transparent, a transparent portion is then interposed between the cells and/or regions of each respective adapted image. The provision of a transparent portion in all adapted images 11, 12, 13 and 14 allows the adapted images to be layered or laid one on top of the other without the overlap or obfuscation of any of the cells and/or regions of the respective adapted images. The layered images are then flattened or merged into the single merged image 10 as seen in FIG. 1, to be used in the display using a screen or grid as described above and in the prior art.

Figure 2:
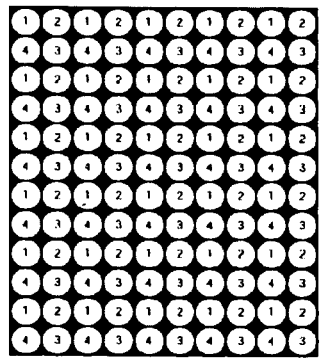
FIG. 2 shows a schematic view of a process according to a first aspect of the present invention applied to four base images and the pattern applied is a circular grid.
Figure 2:
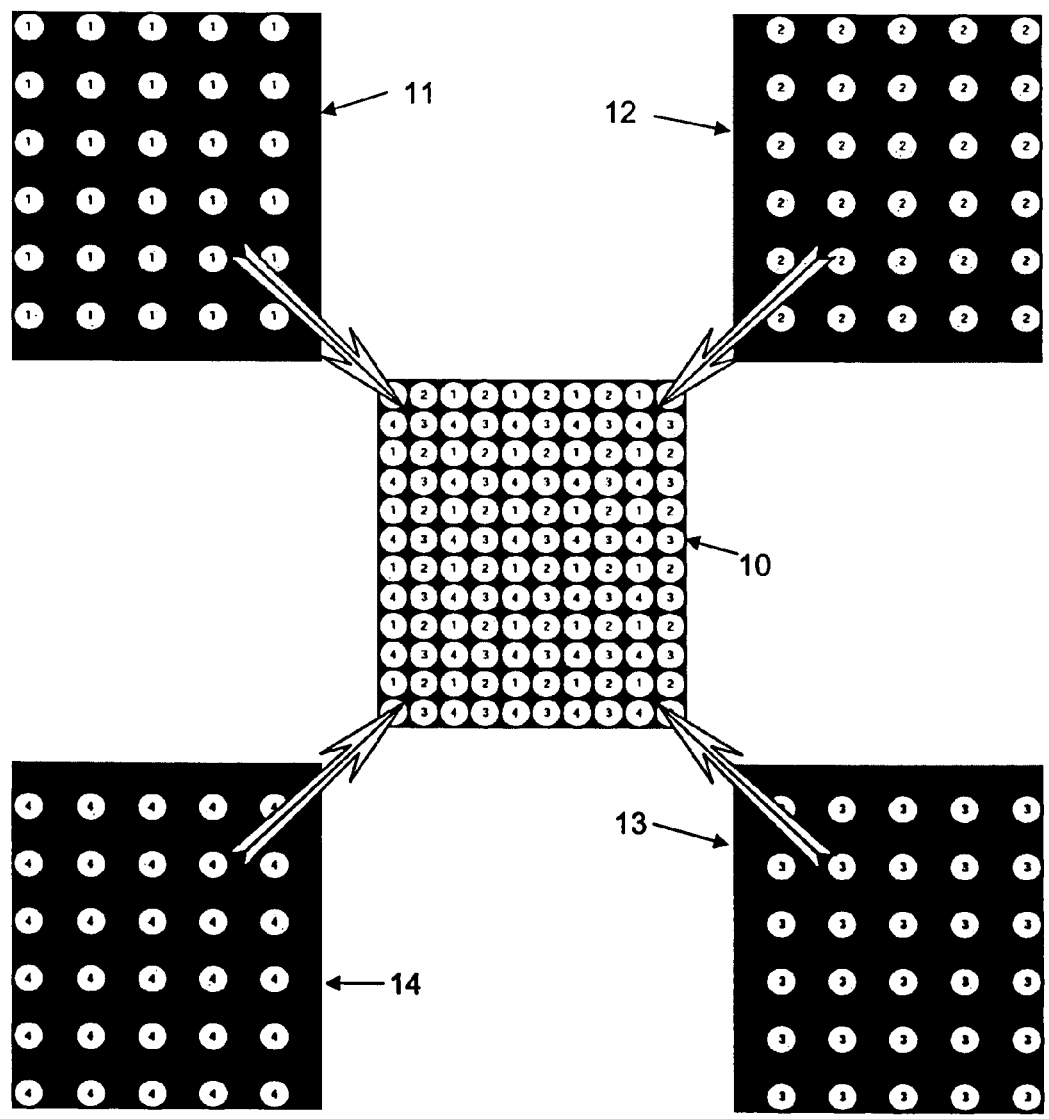

FIG. 2 illustrates the process as described above to four base images but the pattern selected is on a circular grid basis.

Figure 3:
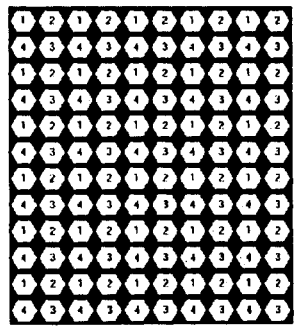
FIG. 3 shows a schematic view of a process according to a first aspect of the present invention applied to four base images and the pattern applied is a hexagonal grid.
Figure 3:
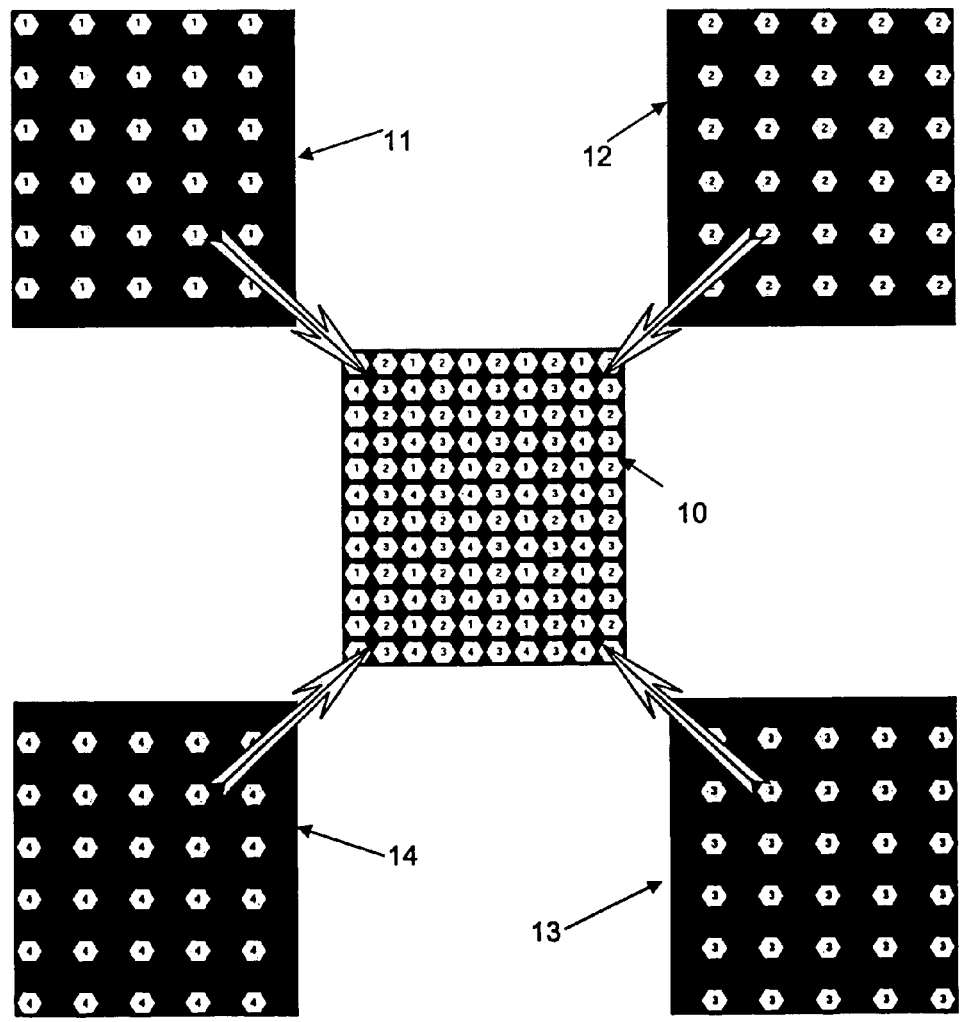

FIG. 3 illustrates the process as described above to four base images but the pattern selected is on a hexagonal grid basis.

Figure 4:
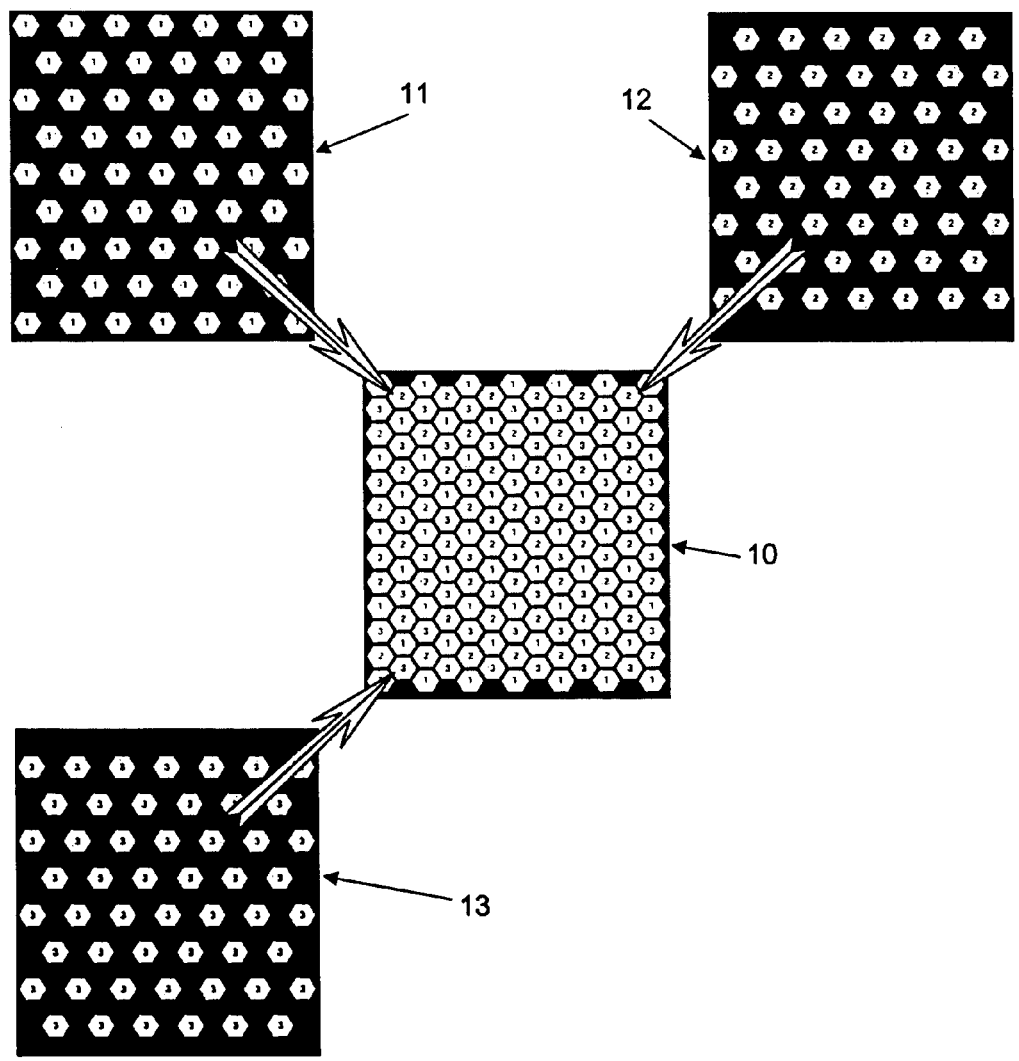
FIG. 4 shows a schematic view of a process according to a first aspect of the present invention applied to three base images and the pattern applied is a hexagonal grid which is then interlaced at high tolerance.

FIG. 4 illustrates the process as described above to three base images and the pattern selected is on a hexagonal grid basis. A different transformation of the base images during the process of creating the adapted images is applicable when three base images are used. A person skilled in the art can identify the transformations to be applied in these cases.

Figure 5:
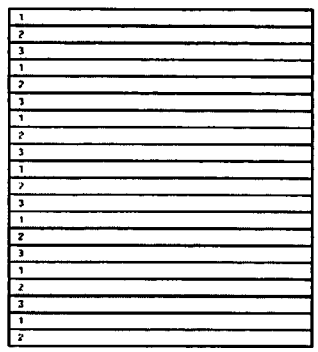
FIG. 5 shows a schematic view of a process according to a first aspect of the present invention applied to three base images and the pattern applied is a rectangular bar grid.
Figure 5:
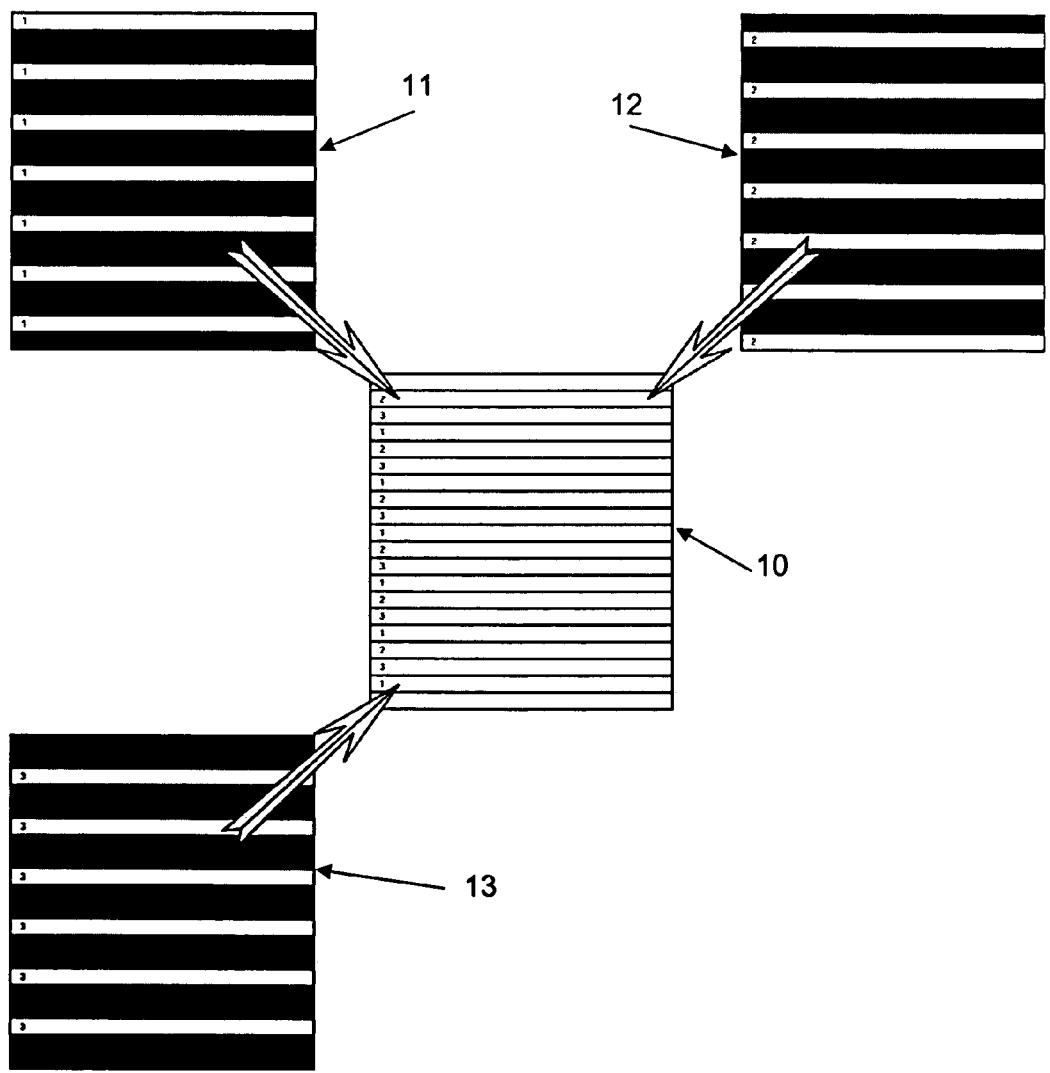

FIG. 5 illustrates the process as described above to three base images but the division is performed on a rectangular bar grid basis. Again, a different transformation of the base images during the process of creating the partially deleted images is applicable when three base images ate used. A person skilled in the art can identify the transformations to be applied in these cases.

Figure 6:
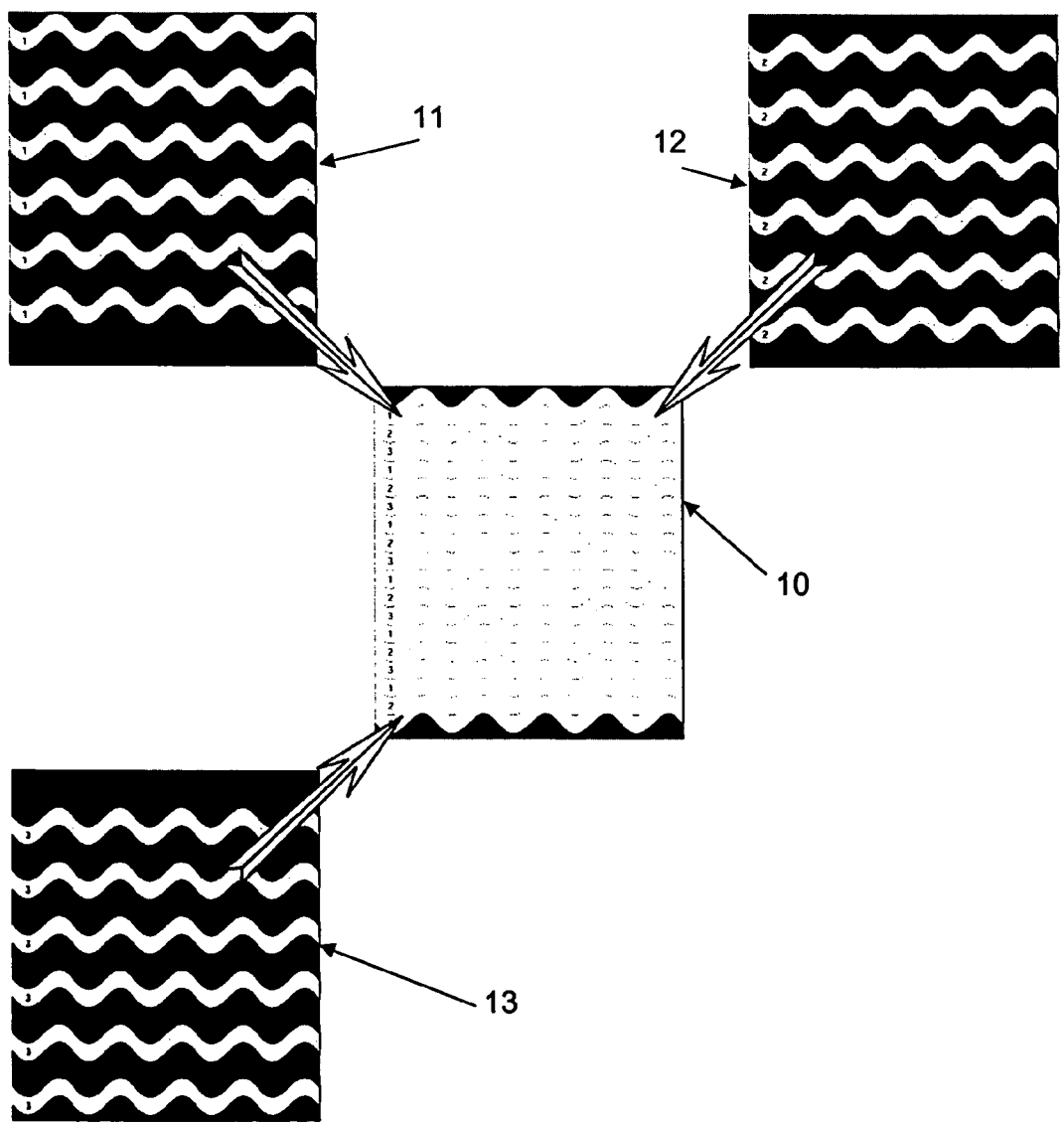
FIG. 6 shows a schematic view of a process according to a first aspect of the present invention applied to three base images and the pattern applied is a waveform grid.

FIG. 6 illustrates the process as described above to three base images but the pattern selected is on a waveform grid basis. Once again, a different transformation of the base images during the process of creating the adapted images is applicable when three base images are used. A person skilled in the art can identify the transformations to be applied in these cases.

Figure 7:
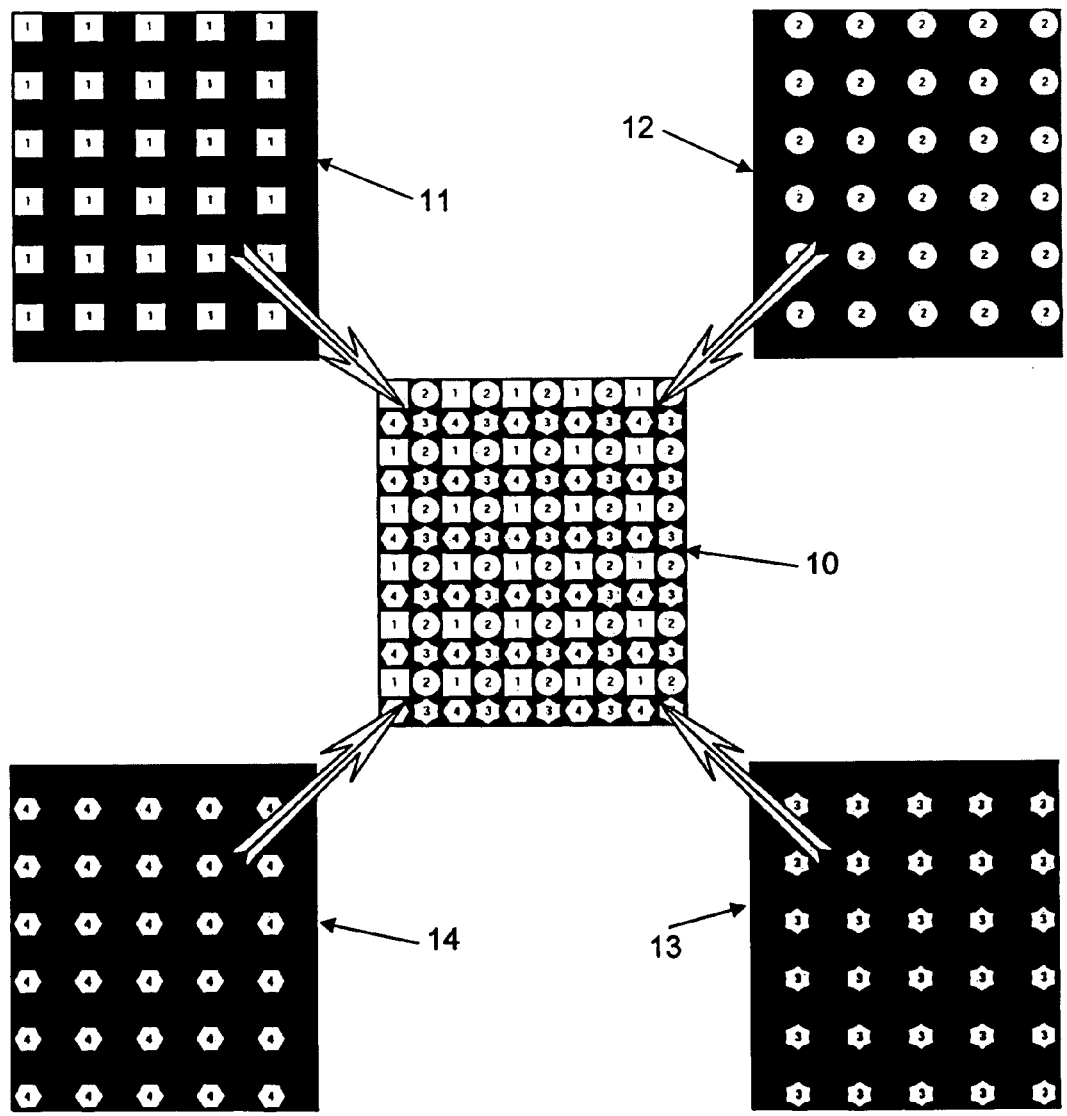
FIG. 7 shows a schematic view of a process according to a first aspect of the present invention applied to four base images, the pattern applied to each being a differently-shaped grid.

FIG. 7 illustrates the process as described above to four base images but the pattern selected for each base image is a differently shaped grid. In this instance the positional deletions or transparencies used during the creation of the respective adapted images are similar to those used in the creation of any adapted image based on the merging of four base images. The significance of using base images divided into differently shaped cells and/or regions is that the tolerance of the final merged image is not as tight as it would be with for example square cells and/or regions but would not be as loose as using circular cells and/or regions.

Figure 8:
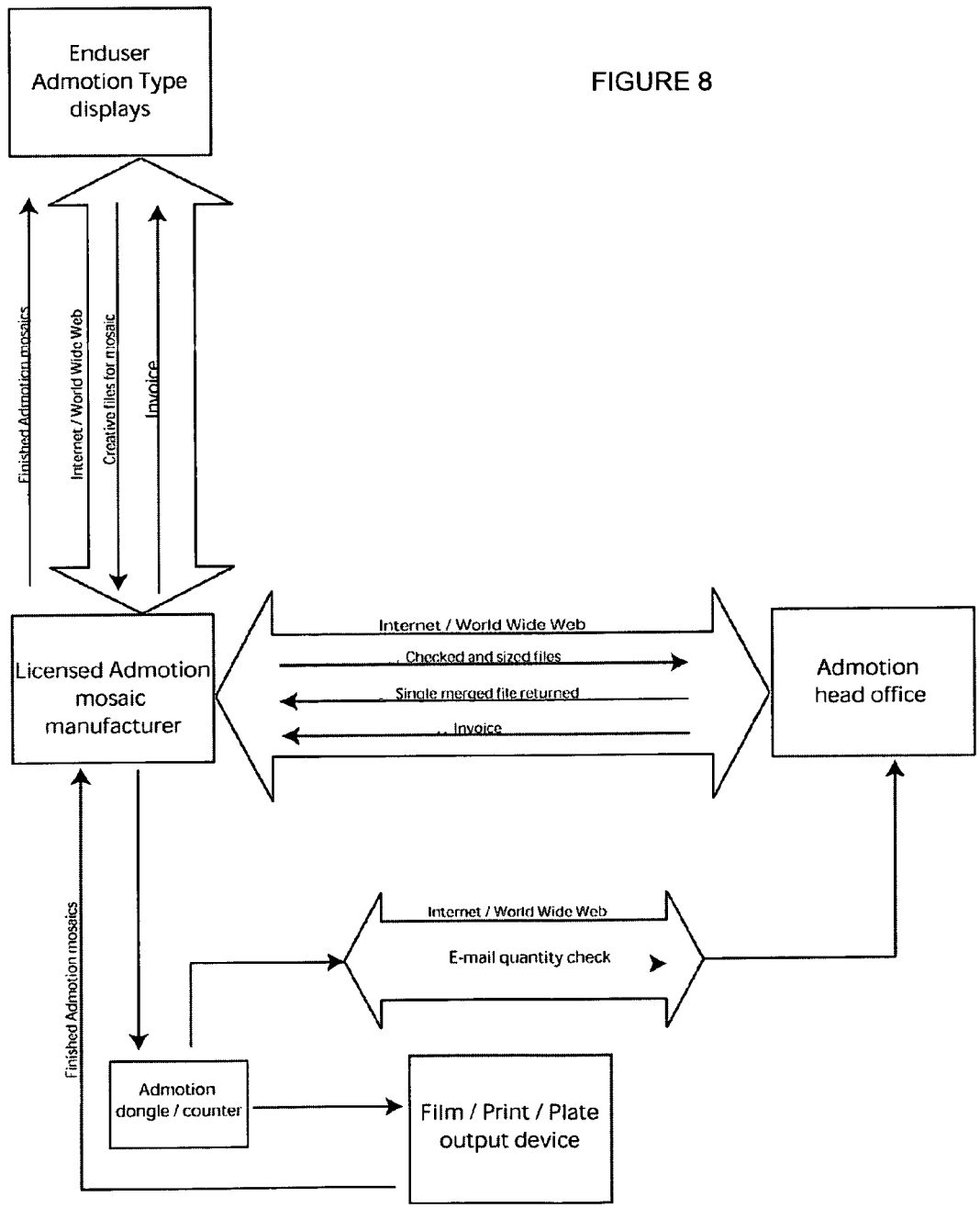
FIG. 8 shows a schematic view of a process according to a second aspect of the present invention wherein the process is adapted to be used over a computer network.

FIG. 8 illustrates a schematic view of a process according to a second aspect of the present invention wherein the process is adapted to be used over a computer network. The process comprises the steps of:
a. at least one end user supplying at least two base images to an operator;
b. the operator checking the base images for suitability and size;
c. applying a process for the creation of a merged image; and
d. forwarding the merged image to the end user.

In this form, it is preferred that the process for the creation of the merged digital image in step (c) in the above computer network based process comprises the steps of:
a. at least one end user supplying at least two base images to an operator;
b. the operator checking the base images for suitability and size;
c. preparing at least two base images in digital format;
d. selecting a pattern wherein said pattern comprises a multiplicity of cells, each cell having n regions wherein n is the number of prepared base images and wherein each region of a cell is assigned to a different prepared base image;
e. applying the pattern to each base image:
f. selecting a mergable portion of each respective base image wherein the mergable portion includes a tile corresponding to the region of each cell assigned to the respective base image;
g. merging of the mergable portions of each respective base image to provide a merged image; and
h. forwarding the merged image to the end user.

The computer network will generally be the Internet or other geographic or virtual computer network such as an intranet or the world wide web. The network will mainly be used for the convenience of transfer of files or images in digital format The process has the following general order of events. An end user uploads or otherwise forwards the required quantity of images to a licensed mosaic or merged image manufacturer. The licensed manufacturer then checks the images or digital files for suitability and size. The licensed manufacturer then forwards the approved images or files to a head office/server. The head office/server performs the merging process which is generally a fully automated process, wherein the files or images are merged into a single image ready for output. This single imago or file is then sent back to the licensed manufacturer. The file is then forwarded through a hardware controller or dongle to the output device. Following output of the merged image the finished mosaic image is sent, generally with an invoice, to the end user. At predetermined times, the hardware controller will provide the head office with the quantity of images or tiles which have been output for a period. This may allow the head office to prepare and forward to the licensed manufacturer, an invoice for any royalty or licensees involved in the application of the process.

The number of cells and/or regions deleted or rendered transparent from each base image after the digital grid has been applied may be related to the number of base images to be merged. For example, if the number of base images to be merged is n, then the number of regions deleted from or rendered transparent in each cell of each base image to create each respective adapted image is n–1. The deleted or transparent cells and/or regions may be replaced with a transparent portion and the unaffected cells and/or regions remain as they were in the base image. The position of the cells and/or regions of the base image which are to be deleted or rendered transparent may depend at least upon the number of base images and the configuration of the merged image.

Figure 9A:
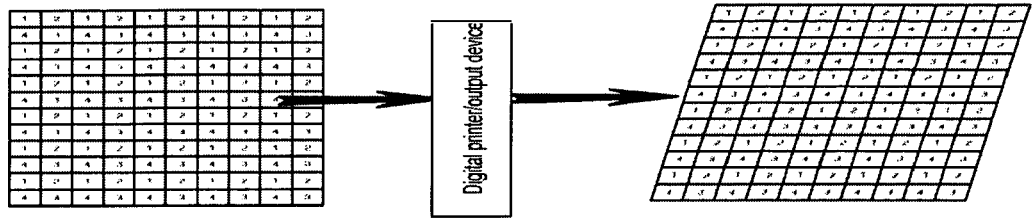
FIGS. 9A-9F show schematic views of an image adjustment process which may be applied to a merged image of the present invention to correct or allow for inaccuracies in the output equipment.
Figure 9B:
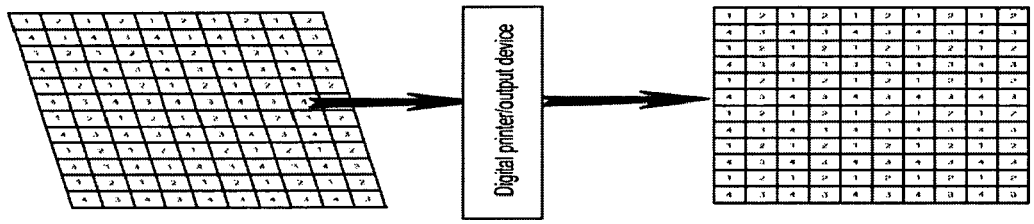
Figure 9C:
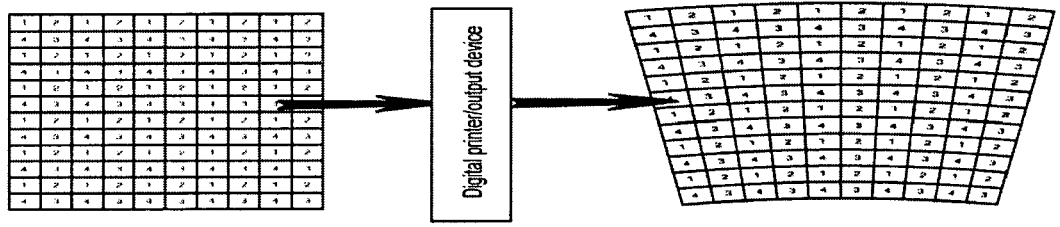
Figure 9D:
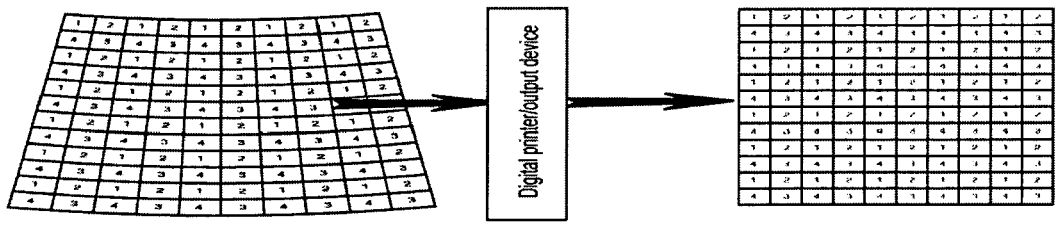
Figure 9E:
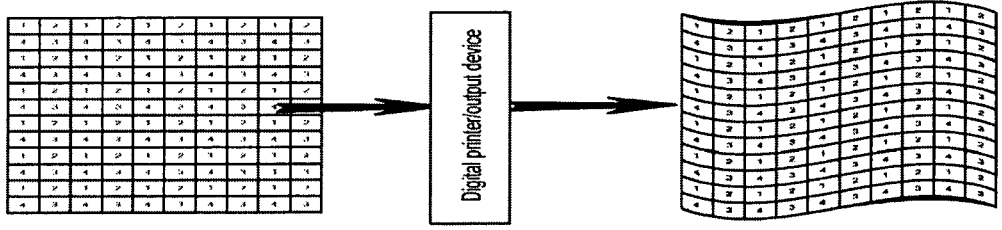
Figure 9F:
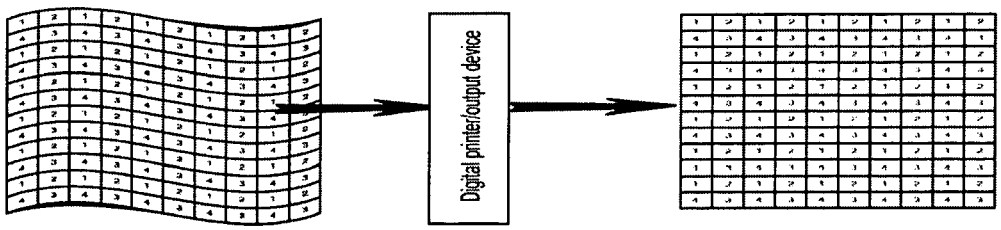

FIGS. 9A-9F illustrate the application of the distortion correction technique to the merged image. FIGS. 9a (parallelogram), 9c (radial) and 9e (waveform) show example situations which may occur if an output device such as a printer or the like has an innate error which results in distortion of the merged image when output. As may be appreciated, the distortion of a complex merged image may result in the image being unusable in a system for displaying the merged image. The present invention allows the application of a correction algorithm to the merged image or the file containing the merged image so that when output ,the merged image is distortion free as illustrated in FIGS. 9b, 9d and 9f. The correction algorithm generally distorts the merged image digitally to account for the distortion which takes place during output of the image.

The invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the description appropriately interpreted by those skilled in the art.

The invention claimed is:

1. A computer implemented process for the creation of a merged image comprising the steps of:
   a. preparing at least two base images in digital format;
   b. selecting a two-dimensional pattern wherein said pattern comprises a multiplicity of cells, each cell having n regions wherein n is the number of prepared base images and each region has different, distinct two-dimensional coordinates and the regions in each cell are arranged in a non-linear pattern;
   c. applying the pattern to each base image to divide each base image into a plurality of cells each having n regions;
   d. providing a merged image template wherein said template comprises a multiplicity of cells, each cell having n regions wherein n is the number of prepared base images and wherein each region of a cell is assigned to a different prepared base image and the template is divided in the same pattern applied to the base images and the regions in each cell are arranged in the non-linear pattern;
   e. selecting a mergable portion of each respective base image wherein the mergable portion corresponds to each region of each cell assigned to the respective base image;
   f. consecutively merging only the selected mergable portions of each respective base image into the merged image template in a non-overlapping manner to provide a single layer merged image; and
   g. outputting the merged image in at least one of a computer readable and/or a physical form.

2. A computer implemented process as claimed according to claim 1 wherein the number of regions of each cell of respective base image effected by the application of the pattern is related to the number of base images to be merged.

3. A computer implemented process as claimed according to claim 2 wherein the number of base images to be merged is n, and the number of regions of each cell of respective base image effected by the application of the pattern is n–1.

4. A computer implemented process as claimed according to claim 1 wherein the process is performed using at least one computer with software to perform the steps in the process.

5. A computer implemented process as claimed according to claim 1 wherein the pattern selected for application to the base images is a grid.

6. A computer implemented process as claimed according to claim 5 wherein each base image has a grid applied to it digitally, to divide the base image into a multiplicity of cells and each cell into a multiplicity of regions.

7. A computer implemented process as claimed according to claim 6 wherein the dimensions of the grid are determined relative to a dimension of either a base image or a dimension of the merged image which is required by a user.

8. A computer implemented process as claimed according to claim 6 wherein the cells and regions into which the grid divides each base image are sized according to a dimension of either the base image or a dimension of the merged image which is required by a user.

9. A computer implemented process as claimed according to claim 6 wherein the cells and regions have a particular shape chosen to achieve or maintain high tolerance with regard to pixel or cells and region spacing.

10. A computer implemented process as claimed according to claim 6 wherein one or more of the base images are divided into differently shaped cells and regions.

11. A computer implemented process as claimed according to claim 1 wherein the application of the pattern to each of the base images is such that when the selected mergable portions of each image are combined to form the merged image, the mergable portions of each image are positioned at a predetermined spacing in relation to one another.

12. A computer implemented process as claimed according to claim 1 wherein the selected mergable portions of each base image are merged digitally to form a single layer image.

13. A computer implemented process as claimed according to claim 12 wherein at least one additional layer is added to the single layer image, the entire additional layer being digitally transparent except for advertising material including trademarks and other digital information, for example vernier scales, calibration scales or image borders.

14. A computer implemented network based process comprising the steps of:
   a. at least one end user supplying at least two base images to an image interrogation means;
   b. the image interrogation means checking the base images for suitability and size;

c. implementing the computer implemented process according to claim 1; and d. forwarding the merged image to the end user.

15. A computer implemented network based process as claimed according to claim 14 wherein the base images are forwarded to an interrogation means which then forwards the base images to a third party for the application of the process for the creation of the merged digital image.

16. A computer implemented network based process as claimed according to claim 14 wherein the third party is able to control the quality of merged images produced.

17. A computer implemented network based process as claimed according to claim 16 wherein the third party is a licensor of the process for the creation of the merged digital image and selectively controls access and use of the process through license agreements with at least one licensee.

18. A computer implemented network based process as claimed according to claim 17 wherein according to the license agreement, the third party/licensor collects income in the form of licence or royalty payments from licensees, according to predetermined parameters of the base images or merged images.

19. A computer implemented network based process as claimed according to claim 17 wherein the third party/licensor is able to accurately track individual merged images and the quantity of base images and/or merged images output for a particular operator/licensee.

* * * * *